(12) United States Patent
Gura et al.

(10) Patent No.: US 6,882,649 B1
(45) Date of Patent: Apr. 19, 2005

(54) LEAST CHOICE FIRST ARBITER

(75) Inventors: Nils Gura, Ulm (DE); Hans Eberle, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/540,729

(22) Filed: Mar. 31, 2000

(51) Int. Cl.[7] .............................................. H04L 12/56
(52) U.S. Cl. ................................. 370/395.42; 370/462
(58) Field of Search ........................ 370/395.4, 395.41, 370/395.42, 443, 444, 462, 398, 422, 380, 230

(56) References Cited

U.S. PATENT DOCUMENTS

| | | |
|---|---|---|
| 4,648,029 A | 3/1987 | Cooper et al. |
| 4,760,521 A | 7/1988 | Rehwald et al. |
| 4,792,944 A | 12/1988 | Takahashi et al. |
| 5,267,235 A | 11/1993 | Thacker ...................... 370/60 |
| 5,301,279 A | 4/1994 | Riley et al. |
| 5,560,016 A | 9/1996 | Fiebrich et al. .............. 395/728 |
| 5,564,062 A | 10/1996 | Meaney et al. .............. 395/732 |
| 5,577,035 A | 11/1996 | Hayter et al. |
| 5,617,575 A | 4/1997 | Sakakibara et al. ......... 395/800 |
| 5,742,594 A | 4/1998 | Natarajan |
| 5,835,491 A | 11/1998 | Davis et al. |
| 5,838,681 A | 11/1998 | Bonomi et al. |
| 5,884,046 A | 3/1999 | Antonov |
| 6,023,732 A | 2/2000 | Moh et al. |
| 6,029,217 A | 2/2000 | Arimilli et al. |
| 6,034,954 A | 3/2000 | Takase et al. |
| 6,069,573 A | 5/2000 | Clark, II et al. |
| 6,072,772 A | 6/2000 | Charny et al. |
| 6,111,886 A * | 8/2000 | Stewart ....................... 370/438 |
| 6,160,812 A * | 12/2000 | Bauman et al. .............. 370/416 |
| 6,370,148 B1 * | 4/2002 | Calvignac et al. ........... 370/412 |
| 6,449,283 B1 | 9/2002 | Chao et al. |
| 6,473,103 B1 | 10/2002 | Bailey et al. |
| 6,487,213 B1 | 11/2002 | Chao |
| 6,570,873 B1 * | 5/2003 | Isoyama et al. ............. 370/375 |

FOREIGN PATENT DOCUMENTS

| | | | |
|---|---|---|---|
| EP | 0 463 943 A2 | 1/1992 | ......... G06F/13/362 |
| EP | 0 507 044 A3 | 10/1992 | |
| EP | 0 868 054 A2 | 9/1998 | |
| EP | 0 869 651 A1 | 10/1998 | |
| EP | 1 096 387 A1 | 5/2001 | |
| WO | WO 98/19439 | 5/1998 | |
| WO | WO 99/26381 | 5/1999 | |
| WO | WO 00/29956 | 5/2000 | |

OTHER PUBLICATIONS

Cell–level path allocation in a three–stage ATM switch Collier, M.; Curran, T.; Communicaitons, 1994. ICC 94, Supercomm/ICC '94, Conference Record, Serving Humanity Through Communications. IEEE International Conference on , May 1–5, 1994 pp.: 1179–1183.*

Path allocation in a three–stage broadband switch with intermediate channel grouping Collier, M.; Curran, T.;IN-FOCOM '93. Proceedings.Twelfth Annual Joint Conference of the IEEE Computer and Communications Societies. IEEE, Mar.–Apr. 28, 1993, p. 927–934.*

(Continued)

*Primary Examiner*—Hassan Kizou
*Assistant Examiner*—Dmitry Levitan
(74) *Attorney, Agent, or Firm*—Zagorin O'Brien Graham LLP (57) ABSTRACT

In a system with multiple requesters making multiple requests for resources, an arbiter prioritizes requests based on the number of requests made by a requester. The highest priority is given to a requester that has made the fewest number of requests. Priority may instead be based on the number of requests made for a particular resource. Priority may also be based on a combination of number of requests made by a requester and number of requests made for a resource. The arbiter may also implement a starvation avoidance mechanism such as a round robin scheme.

26 Claims, 6 Drawing Sheets

OTHER PUBLICATIONS

Maltz, D.A. et al., "MSOCRS: An Architecture for Transport Layer Mobility", ISBN: 0-7803-4383-2, pp. 1037-1045.

Watson, R.W. et al., "The Parallel I/O Architecture of the High-Performance Storage System (HPSS)", Fourteenth IEEE Symposium on Mass Storage Systems, Sep. 11, 1995, pp. 27-44.

Gruber, R. and Dubois-Pelerin Y., "Swiss-Tx: first experiences on the T0 system", EPFL-SCR No. 10 (http://www.grid-computing.net/documents/article1.pdf), Nov. 1998, 6 pages.

Brauss, S., "Communication Libraries for the Swiss-Tx Machines", EPFL-SCR No. 11 (http://www.grid-computing.net/documents/article3.pdf), Nov. 1999, 6 pages.

Working Draft, T11.1/Project 1245-D/Rev 1.9, "Information Technology—Scheduled Transfer Protocol (ST)", May 28, 1998, pp. 1-85.

Tamir and Chi, "Symmetric Crossbar Arbiters for VLSI Communication Switches", IEEE Transactions on Parallel and Distributed Systems, vol. 4, No. 1, 1993, pp. 13-27.

Boden, Cohen et al., "Myrinet: A Gigabit-per-Second Local Area Network", IEEE 1995, pp. 29-36.

Tamir and Chi, "Symmetric Crossbar Arbiters for VLSI Communication Switches", IEEE Transactions on Parallel and Distributed Systems, vol. 4, No. 1, 1993, pp. 13-27.

Kronenberg, Levy et al., "VAXclusters: A Closely-Coupled Distributed System", ACM Transactions on Computer Systems, vol. 4, No. 2, May 1986, pp. 130-146.

Dally, William J., "Virtual-Channel Flow Control", IEEE 1990, pp. 60-68.

Chun, Mainwaring et al., "Virtual Network Transport Protocols for Myrinet", IEEE vol. 18, No. 1, 1998, pp. 52-63.

Pakin, Karamcheti et al., "Fast Messages: Efficient, Portable Communication for Workstation Clusters and MPPs", IEEE 1997, pp. 60-73.

Karol, Hluchyj et al., "Input Versus Output Queueing on a Space-Division Packet Switch", IEEE 1987, pp. 1347-1356.

Scott and Thorson, "The Cray T3E Network; Adaptive Routhing in a High Performance 3D Torus", HOT Interconnects IV, Stanford University, Aug. 15-16, 1996, pp. 1-10.

Mainwaring and Culler, "Design Challenges of Virtual Networks: Fast, General-Purpose Communication", ACM Sigplan Symposium on Principles and Practice of Parallel Programming (PPOPP), Atlanta, GA, May 4-6, 1999.

Chun, Mainwaring et al., "Virtual Network Transport Protocols for Myrinet", Computer Science Division University of California at Berkeley, Aug. 20, 1997, pp. 1-14.

Scott, Steven L., "Synchronization and Communication in the T3E Multiprocessor", Cray Research, Inc., 1996, pp. 26-36.

Mainwaring and Culler, "Active Message Applications Programming Interface and Communication Subsystem Organization", Draft Technical Report, Computer Science Division University of California at Berkeley, Technical Report UCB CSD-96-918, Oct. 1996, pp. 1-45.

Sun Microsystems, Inc., "The Sun Enterprise Cluster Architecture Technical White Paper", 1997, pp. 1-74.

IBM, "JES2 Introduction", Document No. GC28-1794-02, Third Edition, 1997, pp. 1-51.

ANSI, "Information Technology—Scheduled Transfer Protocol (ST)", T11.1/Project 1245-D/Rev. 3.6, Jan. 31, 2000, pp. 1-97.

* cited by examiner

|  | Output Port 0 | Output Port 1 | Output Port 2 |
|---|---|---|---|
| REQUEST VECTOR 0 | 1 | 0 | 0 |
| REQUEST VECTOR 1 | 0 | 1 | 1 |
| REQUEST VECTOR 2 | 1 | 1 | 1 |

FIG. 8

LEAST CHOICE FIRST ARBITER

COPYRIGHT NOTICE

A portion of the disclosure of this patent document including Appendix A and Appendix B, contains material which is subject to copyright protection. This copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

1. Field of the Invention

This invention relates to systems having shared resources and more particularly to arbitrating multiple requests for multiple resources is such systems.

2. Description of the Related Art

Systems having shared resources are common. In many such systems, arbiters have to schedule usage of the shared resources to prevent conflicts resulting from requests for simultaneous access to the same shared resource. One example of such a system having shared resources susceptible to conflicts is a cross bar switch having multiple input ports and multiple output ports in which input ports make requests for connection to the output ports. Each requester or input port sends a request for an output port or a set of requests for multiple output ports to an arbiter. A particular output port may be requested by multiple input ports at the same time. Assuming an output port can be allocated to only one input port at a time, an arbitration decision is made to award the output port to one of the requesters. The arbiter chooses the requests to be granted such that resources (the output ports) are allocated to requesters in a conflict-free way. Thus, certain requests are serviced by being granted an output port and certain requests may be left unserviced in that they are denied an output port. However, the choice of which requests to grant may lead to under-utilization of the resources since some requests may be denied.

Another example of a system having shared resources is a computer system in which multiple processors are coupled to multiple memories. Assume that each processor has access to all of the memories and each memory can only be accessed by one processor at a time. When multiple processors request access to the same memory at the same time an arbitration decision has to be made as to which processor gets to access the memory in question.

While numerous arbitration schemes have been developed to try and provide fair and efficient allocation of system resources for scheduling problems that involve multiple requesters requesting multiple shared resources such as the crossbar switch or multi-processor system described above, it would be desirable to have an improved arbitration scheme that provides for high aggregate usage of the shared resources while still providing a minimum level of fairness.

SUMMARY OF THE INVENTION

Accordingly, the invention provides in one embodiment an arbiter that prioritizes requests based on the number of requests made. The highest priority is given to the requester that has made the fewest number of requests. Resources are scheduled one after the other in that a resource is allocated to the requester with the highest priority first. That is, the requester with the fewest requests (least number of choices) is chosen first. Requesters with more requests have more choices than requesters with few requests and, therefore have a reasonable likelihood of being granted one of their outstanding requests if considered after those requesters with fewer requests.

Alternatively, priority may instead be based on the number of requests made for a particular resource. In addition, priority may be based on a combination of the number of requests made by a requester and the number of requests made for a resource. Utilizing a strategy that considers fewest choices first, increases the number of granted requests and results in higher aggregate resource usage when compared with other arbitration schemes.

In one embodiment, the invention provides a method of sharing multiple resources among multiple requesters using an arbiter. The method includes receiving requests for the multiple resources from the multiple requesters. The arbiter determines respective request priorities corresponding to respective requests for respective resources made by respective requesters, each request priority is determined according to at least one of a requester priority and a resource priority, requester priority being inversely related to a number of requests made by a particular requester, resource priority being inversely related to a number of requests made for a particular resource. The arbiter allocates at least some of the resources according to requester and/or resource priorities. In order to prevent starvation, the method may also use a round robin scheme to allocate resources to requesters.

In another embodiment the invention provides an apparatus that includes a transport mechanism coupled to a plurality of resources and a plurality of requesters. An arbiter is coupled to receive a plurality of requests from the requesters, each of the requests requesting a connection between one of the requesters and at least one of the resources. The arbiter allocates resources to requesters according to at least one of a requester priority and a resource priority, the requester priority and resource priority being inversely related to, respectively, a number of requests for resources made by a respective requester and a number of requests directed to respective resources. The arbiter may further include a starvation avoidance mechanism such as a round robin mechanism to allocate resources to requesters.

BRIEF DESCRIPTION OF THE DRAWINGS

The present invention may be better understood, and its numerous objects, features, and advantages made apparent to those skilled in the art by referencing the accompanying drawings wherein use of the same reference symbols in different drawings indicates similar or identical items.

DESCRIPTION OF THE PREFERRED EMBODIMENT(S)

Figure 1:
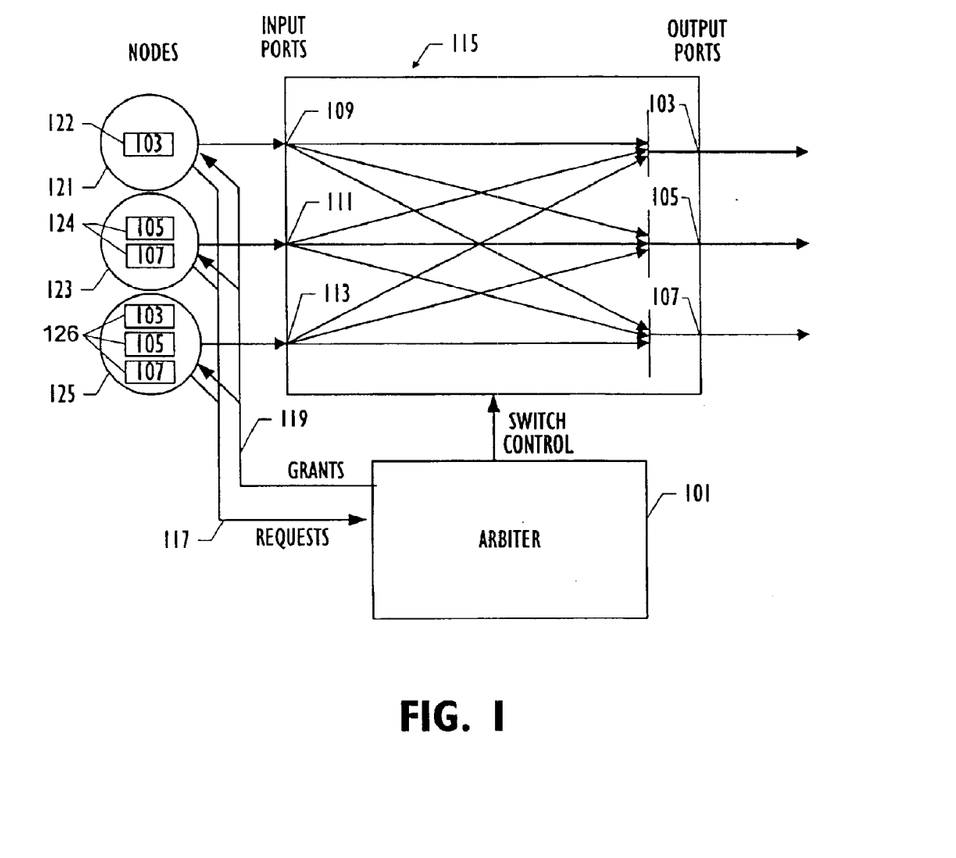
FIG. 1 shows a crossbar switch which can exploit one or more embodiments of the present invention.

Referring to FIG. 1, one embodiment of the invention is illustrated in which arbiter 101 schedules usage of shared resources, i.e., output ports 103, 105 and 107 among input port requesters, 109, 111 and 113. Crossbar switch 115 forwards packets from its input ports, 109, 111 and 113 to its output ports 103, 105 and 107. Each input port can hold multiple packets destined for different output ports. The switch schedule to be calculated should connect input and output ports in such a way that as many packets as possible can be forwarded simultaneously, thus maximizing usage of shared resources. Each requester sends a set of requests to arbiter 101, which then chooses the requests to be granted such that resources are allocated to requesters in a conflict-free way.

In one embodiment of the invention, the arbiter operates in a synchronous manner in that the arbiter receives request signals 117 for shared resources at the same time from the various input ports 109, 111 and 113. Scheduling happens synchronously in that grant signals 119 are sent at the same time and the usage interval for each resource has the same length. Scheduling may be further constrained in that only one requester can use a particular resource at the same time. When developing an arbitration scheme the main goal typically is to achieve high aggregate usage of the resources while still providing a minimum level of fairness, mainly in the sense that starvation of individual requests is prevented.

In one embodiment, the arbiter makes its choices by prioritizing requesters based on the number of their requests. The highest priority is given to the requester with the fewest number of outstanding requests, and the lowest priority is given to the requester with the highest number of outstanding requests. Resources are scheduled one after the other in that a resource is allocated to the requester with the highest priority first. That way the requester with the least number of choices is chosen first. Thus, priority is inversely related to the number of requests being made. Requesters with many requests have more choices than requesters with few requests and, therefore, can be considered later and still have a reasonable likelihood of being granted one of their outstanding requests. That strategy increases the number of granted requests and, with it, results in higher aggregate usage when compared with other arbitration schemes. In one preferred embodiment, the number of outstanding requests is based only on the resources that have not yet been scheduled. That is, the number of outstanding requests is recalculated whenever a resource has been scheduled.

With reference again to FIG. 1, an example illustrates operation of one aspect of an embodiment of the least choice first arbiter. In FIG. 1, it can be seen that node 121, which is coupled to input port 109, has one request 122 for output port 103. Node 123, which is coupled to input port 111, has two requests 124, one request for output port 105 and one request for output port 107, respectively. Node 125, which is coupled to input port 113, has three requests 126, one request for each of the output ports. The arbiter receives those requests from the various input ports and prioritizes the request from node 121 (input port 109) as the highest priority request since that requester has only one request. Node 123 is prioritized as the next highest priority requester since it has two requests and node 125 is the lowest priority requester since it has three requests.

Based upon priority alone, arbiter 101 grants node 121 its request for output port 103 first. Note that while the node attached to the input port is actually making requests, for ease of description, the input ports themselves may be described herein as having requests. After arbiter 101 grants node 121 its request, priorities are recalculated. Both node 123 and node 125 have the same priority after output port 103 is scheduled, since they both have two requests (requests for output port 103 are no longer considered since that output port has been scheduled). The arbiter can now grant one of the requests of node 123 and node 125. For example, if the arbiter grants node 123 its request for output port 105, the arbiter then grants node 125 its request for output port 107. Because the arbiter serviced the requester having the least number of choices first, the number of granted requests can be maximized. To illustrate that, if another arbitration scheme had first granted node 125 its request for output port 103, a total of only two requests would have been granted. Note that the arbiter has not considered fairness in allocating the resources in the example given.

Figure 2:
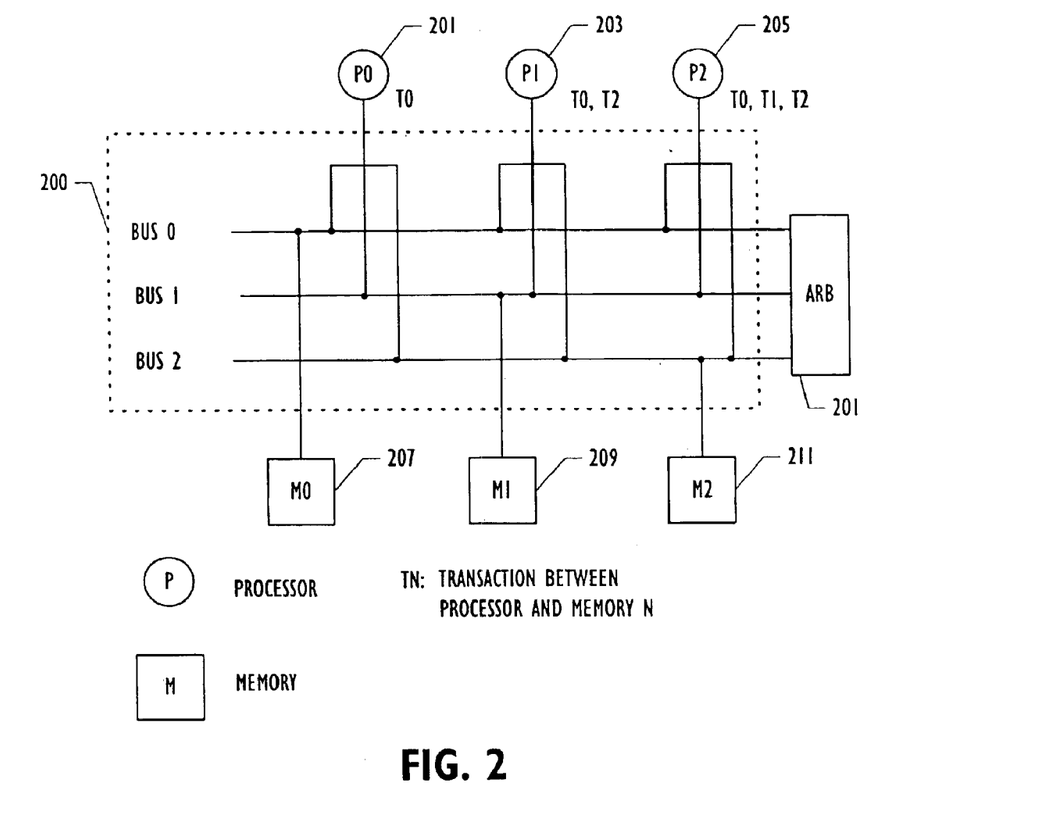
FIG. 2 shows a multi-processor system which can exploit one or more embodiments of the present invention.

Another example where such an arbitration scheme may be utilized is shown in FIG. 2, which is a multi-bus interconnection structure 200 functioning as a transport mechanism for connecting multiple processors 201, 203 and 205 (also referred to in FIG. 2 as P0, P1 and P2) with multiple memories 207, 209 and 211 (also referred to in FIG. 2 as M0, M1 and M2). Each processor can have multiple outstanding transactions such as read and write operations. Similar to the switch embodiment described in relation to FIG. 1, the bus schedule to be calculated connects processors and memories in a conflict-free way, ideally, such that at a given time as many transactions as possible can be executed in parallel.

The arbiter 201 may be coupled to each of the buses shown in FIG. 2. The request and grant lines may be incorporated into the buses as well or may be separately coupled to the arbiter. In fact, the arbiter, rather than being separate as shown, may in fact reside in one or more of the processors or memories, or be distributed among the processors and memories in a manner described further herein.

Assuming a central arbitration scheme utilizing arbiter 201, processor P0 requests transaction T0 for memory M0 from the arbiter, processor P1 requests transactions T0 and T2 for memories M0 and M2, respectively. Processor P2 requests transactions T0, T1 and T2 to memories M0, M1 and M2, respectively. As with the switch embodiment described previously, the arbiter gives the highest priority to processor P0 since that processor has the fewest requests. After P0 is granted its T0 request, P1 has one request pending and P2 has two requests pending, since M0 has already been allocated. Thus, P1 is granted its T2 request since it has higher priority (only one request) and finally P2 is granted its T1 request. Thus, the arbiter grants P0 its T0 request, P1 its T2 request and P2 its T1 request, thus maximizing utilization of buses 200.

An additional factor to be considered in developing an arbitration scheme is to provide fairness in the sense of avoiding starvation for any particular request. Thus, a round robin scheme may be employed in addition to the arbiter prioritizing the requester with the fewest requests first. Various round robin approaches will be described further herein.

A detailed description of an arbiter is provided in the program listing in Appendix A showing procedure arbitrate, which describes one embodiment of an arbiter according to the present invention. There are two main data structures of the interfaces of procedure arbitrate. The first is the Boolean matrix R, which represents the input signals to the arbiter (line 8). R[i,j] indicates whether requester i is requesting resource j. The second main data structure is the integer array S, which represents the output values of the arbiter (line 10). S[i] indicates which resource is allocated to requester i.

The program illustrates the operation of one embodiment of the arbiter each time the arbiter receives requests from the plurality of requesters. As described previously, those requests may be received synchronously. On entry into the arbitration sequence as represented in the procedure arbitrate, the schedule S is initialized (line 16) to show no requests have been granted and the number of requests are calculated for each requester (lines 18–19). Then for each resource available to the requesters, the procedure first determines if the round robin position is asserted. If so, the request is granted. (lines 24–25).

The round robin position in the illustrated embodiment is determined by the index variables I and J along with the loop variable res. For every "schedule cycle", the requester offset I is incremented (lines 47–48). If I rolls over, the resource offset J is incremented. A schedule cycle includes the execution of the code described by the procedure arbitrate, including the round-robin determination and least choice first arbitration. Note that all resources are scheduled during a schedule cycle.

Starting with I=0 and J=0 for the first schedule cycle, the round robin positions for three requesters [0:2] and three resources [0:2] for four schedule cycles are as follows:

Schedule cycle 0: [1,0], [1,1], [2,2]
Schedule cycle 2: [1,0], [2,1], [0,2]
Schedule cycle 2: [2,0], [0,1], [1,2]
Schedule cycle 3: [0,1], [1,2], [2,0].

Thus, it can be seen that a different position in array R is designated as the start of the round robin for each schedule cycle. The "round-robin positions" within matrix R form a diagonal during every schedule cycle. The starting position for the diagonal moves downward by one element once every schedule cycle (lines 47,48). When the index J increments, the starting position moves over to the top of the next column in array R. Note that only one of the elements of the diagonal is guaranteed to be granted (if it is asserted) per schedule cycle. That is the first round robin position in each schedule cycle.

While the arbiter has been described in the software listing of procedure arbitrate to provide a detailed example of operation of one embodiment of the arbiter, the same functionality may preferably be implemented in hardware to increase the speed with which the arbiter can respond to requests as described further herein. In other embodiments, portions of the arbiter may be implemented in hardware and other portions in software depending on the needs of a particular system. Further, the iterations of the sequential calculations of the schedule (lines 21–46), may be implemented with the help of look-ahead techniques. That is, as an alternative to the sequential approach described in Appendix A, a look-ahead technique can instead schedule resources in parallel rather than sequentially. Each resource must know what the other resources will decide. Because that information is deterministic, each resource can calculate the needed information. That parallel approach can speed up determinations.

There are additional embodiments of the arbiter. For example, the round-robin scheme can be varied in different ways. If it is desirable to guarantee that more than one element can be granted, the arbiter could consider all elements of the round robin diagonal before other requests are considered each schedule cycle. That is illustrated in detail in Appendix B.

In another embodiment, the "round-robin positions" cover a row of elements in R rather than a diagonal during each schedule cycle. That is illustrated by the following code segment, which replaces lines 24 and 25 in Appendix A.

If R[I, (J+res) mod MaxRes] then
  gnt := I.

Note that with this embodiment, the requester with the requests covered by the row specified by the round robin positions is guaranteed to be granted one of its requests.

In a similar embodiment, the "round robins positions" cover a column of elements in R rather than a row during each schedule cycle. That is illustrated by the following code segment which replaces lines 24 and 25 in Appendix A.

```
If res = 0 then
begin
  r := 0;
  repeat
    if R[(r+I) mod MaxReq, J] then
      gnt := (r+I) mod MaxReq;
    r := r+1;
  until (r= MaxReq) or (gnt <> -1);
end
```

Yet another possibility is to only consider one "round-robin position" per schedule cycle as shown in the following code segment, which replaces lines 24 and 25 in Appendix A.

If (res=0) and req[I,J] then
  gnt := I.

In still another starvation avoidance approach, a round robin scheme ages requests. The longer a request waits, the higher a priority the request receives and the sooner it is considered by the round robin scheme. Any of the round-robin schemes described guarantee that every request is periodically considered. That way, starvation can be prevented. Other schemes may be implemented to prevent starvation as well. In fact, any scheme that guarantees that every request is periodically considered, prevents starvation. For example a statistical approach can be used to provide that guarantee. One example of such an approach is a random scheme that provides a probability that an element will be visited within a particular time period.

The main parameter of a round-robin scheme is the period at which elements of R are visited. For the arbiter described in Appendix A, the worst-case period is the total number of requesters times the total number of resources (MaxReq*MaxRes). The period can be shortened if the round-robin scheme can guarantee that more than one element of R (if asserted) is granted in one schedule cycle such as in the approach illustrated in Appendix B. That can be useful if the matrix R is large.

The period of the round-robin scheme also determines the minimum fraction of resource usage that a requester is guaranteed to obtain. For example, if in FIG. 3A, R[2,1] is always asserted, requester 2 is guaranteed to get access to resource 1 at least once every 9th schedule cycle.

Referring again to the program listing of the procedure arbitrate in Appendix A, once the round robin position has been tested in lines 24 and 25, if the round robin position does receive a grant, then the procedure assigns the granted resource to the position in S corresponding to the requester (lines 39–45) and adjusts nrq values appropriately.

If no round robin position is true, i.e. no request is being made for that resource by that requester, then the procedure arbitrate determines for a particular resource, i.e., a particular column in R identified by [(res+J) mod MaxRes], the requester with the fewest outstanding requests and that requester is granted its requested resource (lines 29–36).

If either the round robin position or another position in array R is granted a resource, then the procedure updates array S by writing the number of the resource into the position in S corresponding to the requester (line 40). That is S[i] is written with the resource number, where i represents the requester granted the resource. The requester row in array R for the requester that was granted the resource is modified to indicate that there are no requests in that row, since only one request can be granted per requester (line 41)). The number of requests (nrq) for all the requesters requesting the granted resource is reduced because requests for a resource already allocated cannot be fulfilled and thus are not counted (lines 43–44). The number of requests (nrq) for the requester that was granted the resource is set to 0 (line 42). The procedure arbitrate then ends by incrementing I and J appropriately (lines 47–48).

Figure 3A:
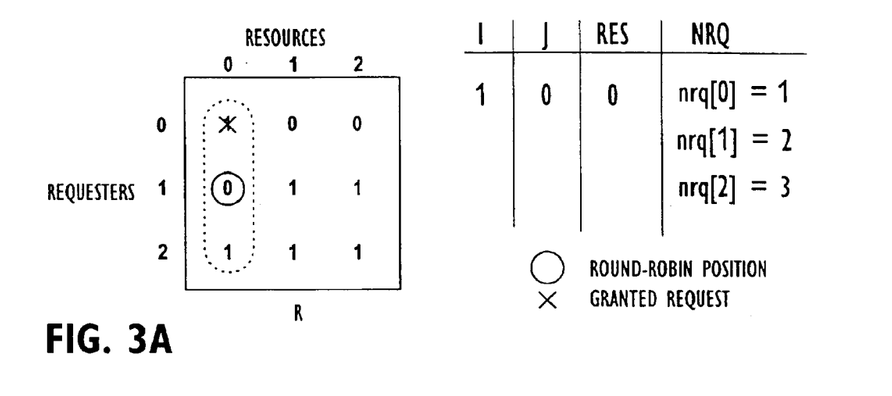
FIGS. 3A–3C illustrates operation of one embodiment of the invention where priorities are determined according to a number of requests each requester makes.

The operation of the embodiment illustrated in procedure arbitrate in Appendix A will now be described with relation to FIGS. 3A–3C. Assume that I and J are at [1,0] on entry into procedure arbitrate and R is as shown as shown in FIG. 3A. Array R shows that there are three requesters in the system and three resources. Requester 0 is requesting resource 0, requester 1 is requesting resources 1 and 2 and requester 3 is requesting resources 1, 2 and 3.

The number of requests is shown for each of the requesters: nrq[0]=1, nrq[1]=2 and nrq[2]=3. The initial round robin position in R evaluated by the arbiter is R [1,0] as a result of the initial value of I and J. Because that position is not asserted (i.e. is false), procedure arbitrate checks if there are any other requests for resource 0, and determines that requester 0 and 2 are requesting resource 0. Because requester 0 has the smallest number of requests (nrq), the arbiter grants resource 0 to requester 0, as indicated by the X at R[0,0]. Procedure arbitrate zeros out row R[0,x] (made false) and reduces the number of requests for requester 2 by one (nrq[2]=2) and zeros out the number of requests by requester 0 (nrq[0]=0).

Figure 3B:
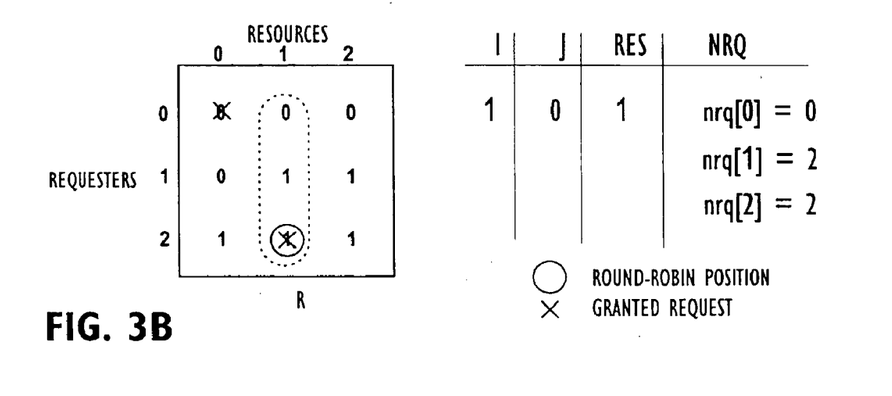

On the next iteration through the allocation loop as shown in FIG. 3B, with the loop variable res=1, the arbiter evaluates round robin position R[2,1] first. Because that position is asserted, the arbiter grants requester 2 that request as indicated by the X. The row R[2,x] is zeroed out (made false) and the number of requests for requester 1 is reduced by one (nrq[1]=1). The number of requests by requester 2 is set to 0 (nrq[2]=0). FIG. 3B illustrates that the requester 0 row was zeroed out after the requester was granted a resource in FIG. 3A. The "X" is still shown at R[0,0] to show that resource was allocated to that requester previously.

Figure 3C:
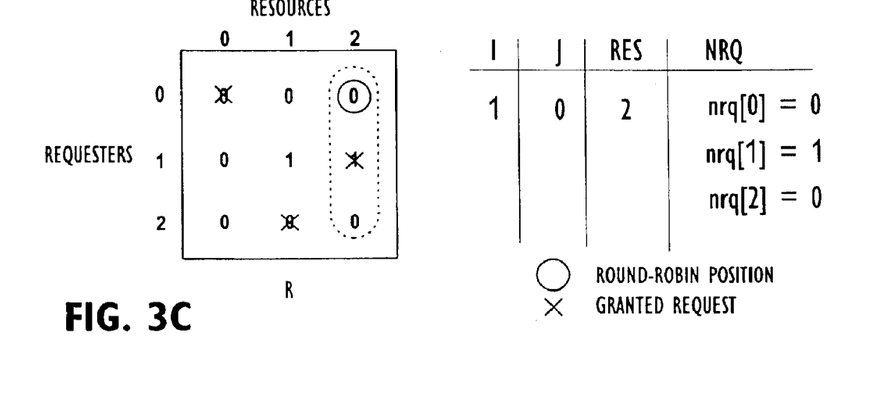

In the final allocation loop of this schedule cycle shown in FIG. 3C, with the loop variable res=2, the arbiter first evaluates round robin position R[0,2]. That position is false so the arbiter determines if there are any other requests for that resource. The only request for that resource is from requester 1 which is granted resource 2. Thus, during that schedule cycle, because the requester with the fewest choice (requester 0) was serviced first, high utilization efficiency of the resources could be achieved.

Figure 4:
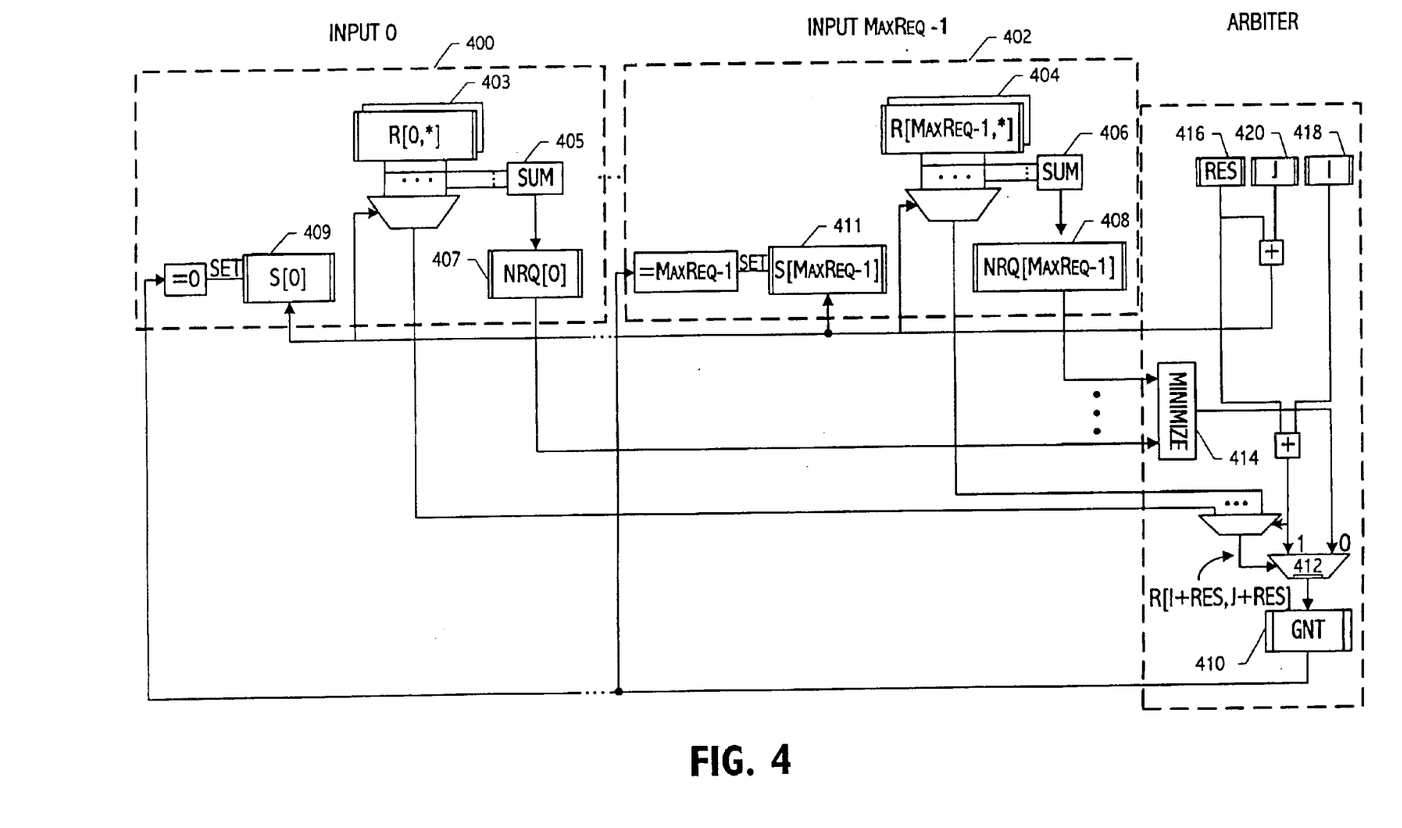
FIG. 4 illustrates a block diagram of a hardware implementation of an arbiter according to one embodiment of the present invention.

As previously stated, if speed is a consideration, which is likely in many if not most applications, a hardware implementation may be preferred. Referring to FIG. 4, a block diagram of a hardware implementation of the arbiter is illustrated. Assume there are MaxReq inputs to the arbiter. FIG. 4 illustrates hardware 400 associated with the first requester (input 0), which corresponds to requester 0 and hardware 402 associated with the last requester (MaxReq−1). The embodiment illustrated in FIG. 4 operates as follows. Each of the elements of R[i,*], which includes elements 403 and 404, is initialized, where * represents the number of resources. Thus, for example, element 403 contains all requests input by the associated requester 0 for the various resources. In addition, the array S, which includes elements 409 and 411 of the illustrated hardware, is reset. The requests for the illustrated elements 403 and 404 are summed in summers 405, 406 to generate a number of requests (nrqs) 407 and 408 for the respective requesters. If R[I+res, J+res]=I, then grant (GNT) 410 is set to (I+res) through multiplexer 412. That is, the round robin position is granted. Otherwise, grant (GNT) 410 is set to the input with the minimum number of requests, which is determined in minimize circuit 414. If there is no request for the current output, grant is set to −1 (note that the logic to set grant to −1 is assumed to be contained within grant (GNT) 410). If grant (GNT) 410 is not −1, then the location S[gnt] (e.g. 409) is set to J+res, which indicates the resource granted to that requester. Each of the elements of R[gnt,*] is set to 0, where * represents the resources. The register 416 holding "res" is incremented so res=res+1. The hardware continues the calculations for S until res=MaxRes, that is, the last resource is scheduled when S[res=MaxRes−1] is evaluated. The register 418 containing the index I is incremented so I=I+1. If I=MaxReq, then I is set to 0 and the register 420 containing J is incremented. The embodiment illustrated in FIG. 4 is an illustrative block diagram and does not show all the details described. As would be known to those of skill in the art, those details along with many other hardware implementations can be provided to implement the various embodiments described herein.

In another embodiment the calculation of priorities may be varied. For example, rather than assigning priorities to the requesters as illustrated in procedure arbitrate, priorities can be assigned to the resources. More specifically, the priority of a resource is given by the number of requesters that request it. That is, the highest priority is given to the resource that is requested by the fewest number of requesters, and the lowest priority is given to the resource that is requested by the most number of requesters. Resources are assigned to the requesters one after the other.

Figure 5A:
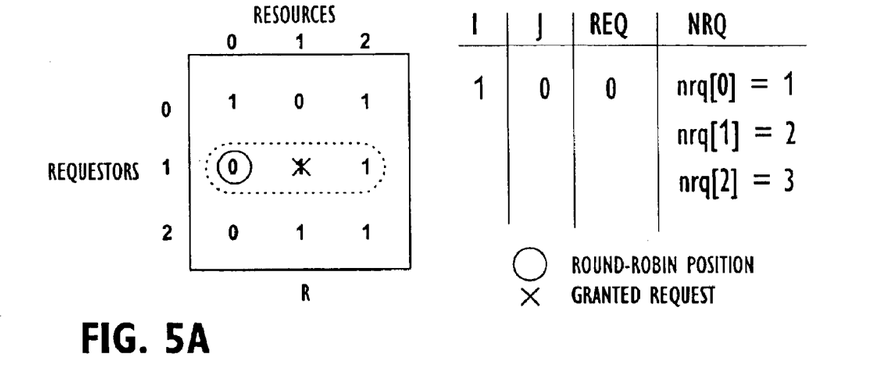
FIGS. 5A–5C illustrates operation of one embodiment of the invention where priorities are determined according to a number of requests each resource receives.
Figure 5B:
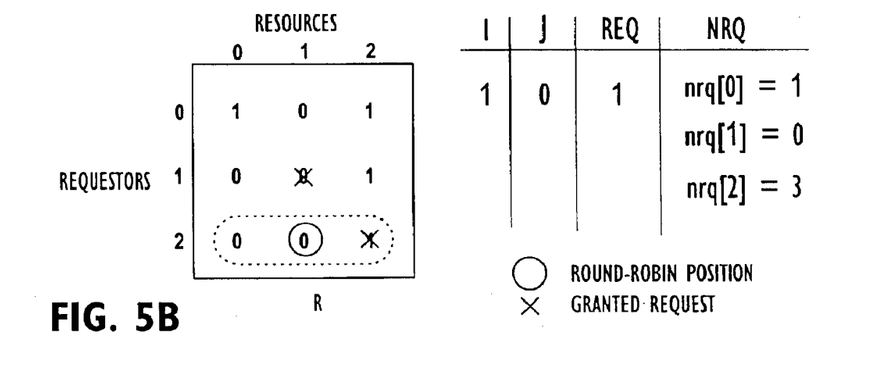
Figure 5C:
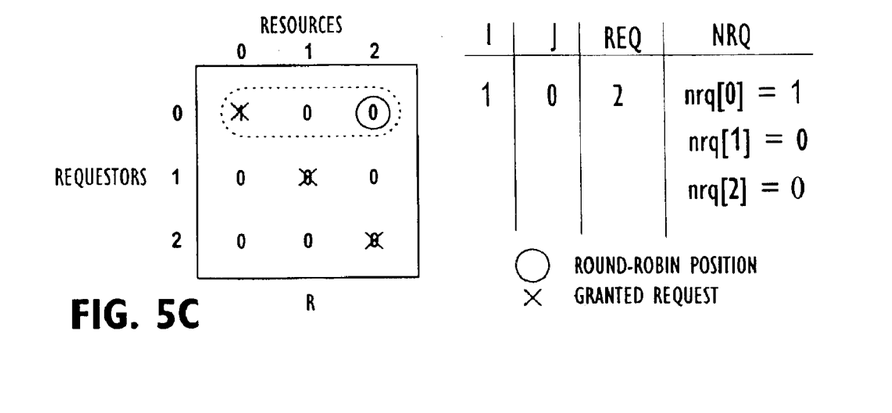

Thus, assuming a configuration as shown in FIGS. 5A–5C, with three requesters and three resources, each requester 0, 1 and 2 is evaluated in turn to see what resources are being requested and the requested resource with the highest priority is granted to that request. Assume the same round robin positions and I and J values as in FIGS. 3A–3C. "Req" represents the loop variable that together with offset I, determines the requester being scheduled. In this embodiment, the arbiter is modified to determine priorities with relation to resources and not requesters.

The number of requests (nrq) for each of the resources is: nrq[0]=1, nrq[1]=2 and nrq[2]=3. Assume the arbiter of this embodiment uses a similar round robin scheme as that used by the arbiter in FIGS. 3A–3B. In FIG. 5A, the arbiter evaluates the initial round robin position R [1,0], which results from the initial value of I and J. Because that position is not asserted (i.e. is false), the arbiter according to this embodiment checks if there are any other requests by requester 1. Because requester 1 is requesting resources 1 and 2 and resource 1 has a higher priority than resource 2, the arbiter grants resource 1 to requester 1. All the requests for resource 1 are zeroed out.

On the subsequent iteration to assign resources illustrated in FIG. 5B, the arbiter evaluates the round robin position R[2,1] first. Because that position was zeroed out, the arbiter checks if requester 2 is making any other requests for resources. Requester 2 is also requesting resource 2, its only remaining request and thus the arbiter grants resource 2 to requester 2. The column representing resource 2 is zeroed out. Referring to FIG. 5C, on the final iteration which completes checking all requests in R, the arbiter evaluates round robin position R[0,2] first. Since that position is false, the arbiter then determines if any other resources are being requested by requester 0. Since requester 0 is also requesting resource 0, the arbiter grants that resource to requester 0.

In still another embodiment, the arbiter calculates priorities for both the requesters and resources, and uses those priorities to calculate a priority for each element in R. For example, the number of requests may be added together to a priority for a request, i.e., a position in R. The scheduler then iteratively grants the request with the highest priority. That way, the priority of an element in R indicates the degree of freedom of its requester as well as of the requested resource. As in other embodiments, a scheme to prevent starvation may be included. However, a scheme to prevent starvation may not always be necessary. For example, some applications may have a guaranteed pattern of requests that makes the need for starvation avoidance unnecessary.

Figure 6:
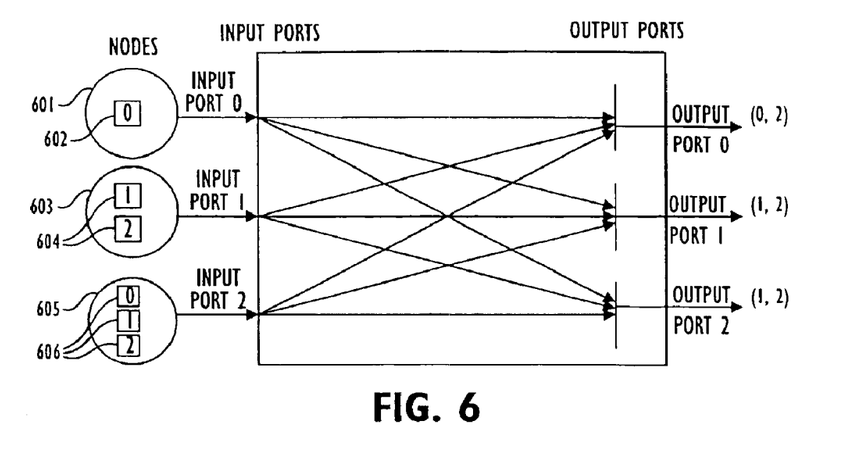
FIG. 6 illustrates a switch that utilizes a distributed embodiment of the present invention.

The arbiters described so far have been for a centralized arbiter implementation. A distributed version of the least choice first arbiter is also possible. That version is distributed in that the selection of requests is performed by arbitration logic associated with the resources and requesters rather than by centralized arbiter logic. For example, assume a transport mechanism such as the simple 3×3 switch shown in FIG. 6 having three input ports and three output ports. Thus, there are three requesters and three resources. Node 601, associated with input port 0, has one request 602 for output port 0. Node 603, associated with input port 1, has two requests 604 for output ports 1 and 2, respectively. Node 605 associated with input port 2 had three requests 606, for output ports 0, 1 and 2, respectively. As shown in FIG. 6, output port 0 has requests from input port 0 and input port 2. Output port 1 has requests from input port 1 and input port 2. Output port 2 has requests from input port and input port 2.

Figure 7:
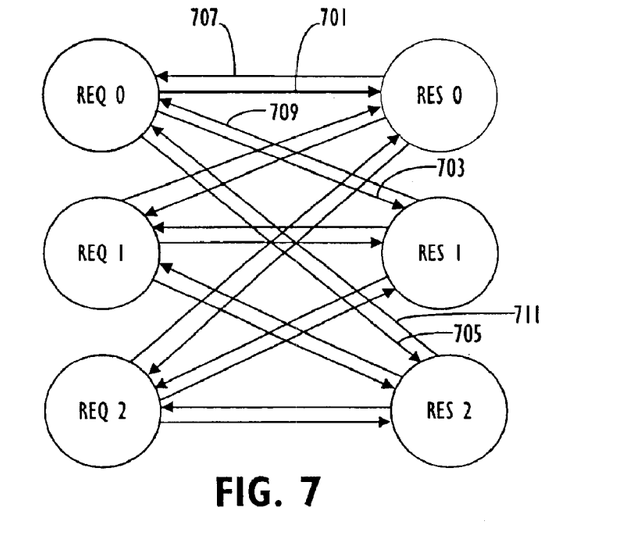
FIG. 7 illustrates the requests and grants passed by requesters and resources in an exemplary distributed system.

Referring to FIG. 7, showing an exemplary distributed implementation for the arbitration scheme disclosed herein, the requesters REQ 0, REQ 1 and REQ 2 supply request signals to and receive grant signals from each of the resources RES 0, RES 1 and RES 2. For example, requester REQ 0 sends request signal 701, 703 and 705 to resources RES 0, RES 1 and RES 2, respectively. Requester REQ 0 receives grant signals 707, 709 and 711 from resources RES 0, RES 1 and RES 2. In one embodiment, during an arbitration period, each resource receives request vectors indicating which requests are asserted from all requesters. A resource grants one of the received requests according to the priority scheme described herein and notifies that requester via an asserted grant signal.

Figure 8:
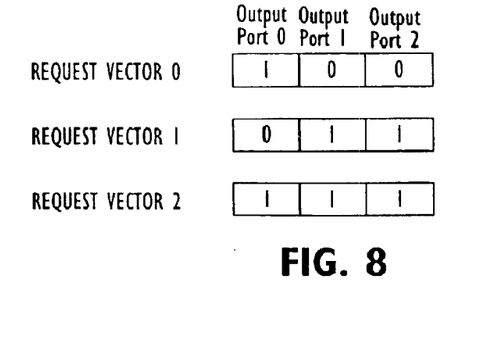
FIG. 8 illustrates exemplary vectors of requests sent from a requester to a resource in an exemplary distributed system.

The request vectors may be provided as shown in FIG. 8 where request vector 0 corresponds to input port 0, request vector 1 to input port 1 and request vector 2 to input port 2. Thus, the request vectors indicate by an asserted bit, which output port is requested. The resources can determine from the request vectors how many requests a particular requester has made. From the example shown in FIGS. 6–8, requester REQ 0 (input port 0) has made 1 request for output port 0, requester REQ 1 (input port 1) has made 2 requests for output ports 1 and 2, and requester REQ 2 (input port 2) has made 3 requests for output ports 0, 1 and 2.

In one embodiment, a sequential scheme is utilized to implement a distributed arbiter. The sequential scheme in that embodiment requires n rounds with n being the number of resources. For each round i (i=0 . . . n−1):

(1) Each requester that has not yet received a grant and that is requesting resource i sends a request. The request is accompanied by a priority which is the inverse of the number of resources that the requester is requesting and that have not yet been scheduled in a previous round.

(2) The resource selects the request with the highest priority and sends a grant to the corresponding requester. If there is more than one request with the highest priority, a round-robin scheme is used to select one of the requesters. Note that all the requesters are informed by all resources when a resource has been granted so requesters know what has been scheduled in a previous round.

The rounds continue until all the resources have been scheduled.

A second embodiment uses an iterative scheme with requesters and resources making choices in parallel. In one iteration of the parallel approach according to this embodiment:

(1) Each requester that has not yet accepted a grant, sends a request to each resource that it is requesting and that has not yet been allocated. The request is accompanied by a priority which is the inverse of the number of requests the requester is sending.

(2) Each resource selects the request with the highest priority. If there is more than one request with the highest priority, a scheme such as a round robin scheme may be used to select one of the requests. A grant is sent to the requester of the selected request. The grant is accompanied by a priority which is the inverse of the number of requests the resource has received.

(3) If a requester receives more than one grant it accepts the grant with the highest priority. If there is more than one grant with the highest priority a round robin scheme is used to select the grant to be accepted. If a grant is accepted, the corresponding resource is allocated.

While in the worst case n iterations are needed to schedule all resources, a smaller number of iterations will generate schedules which are nearly optimal for most patterns of requests.

Note that either or both of the resources and requesters in a distributed approach may still implement a round robin scheme to ensure that no starvation occurs in the system. Further, the distributed arbiter may implement only the least choice priority scheme on either the resource side or the requester side.

The distributed approach described herein for the switch in FIG. 6 is equally applicable to systems requiring arbitration for resources such as the multiprocessor system illustrated in FIG. 2.

Thus, an arbiter has been described that achieves high aggregate usage of the resources while still providing a minimum level of fairness, mainly in the sense that starvation of individual requests is prevented. The arbiter makes decisions based on granting resources according to a number of requests made by a requester, number of requests made for a resource or a combination of the two. The approach described herein can be utilized in a centralized arbitration scheme or in a distributed arbitration scheme. That approach increases the number of granted requests and results in high aggregate usage of shared system resources when compared with other arbitration schemes.

The description of the invention set forth herein is illustrative, and is not intended to limit the scope of the invention as set forth in the following claims. The various embodiments may be used in various combinations with each other not particularly described. For instance, various of the starvation avoidance approaches described herein may be used in the distributed scheme. Further, the software described herein is used solely to describe operation of the system and many other data structures and hardware and software solutions can be based on the teachings herein. Those and other variations and modifications of the embodiments disclosed herein, may be made based on the description set forth herein, without departing from the scope and spirit of the invention as set forth in the following claims.

APPENDIX A

```
1   var
2   I: 0..MaxReq-1;                                (* current round-robin
                                                     requester offset *)
3   J: 0..MaxReq-1;                                (* current round-robin resource
                                                     offset *)
4   req: 0..MaxReq-1;                              (* requester *)
5   res, r: 0..MaxRes-1;                           (* resource *)
6   gnt: -1..MaxReq-1:                             (* granted request *)
7   min: 0..MaxRes+1;                              (* minimum number of
                                                     requests *)
8   R: array [0..MaxReq-1,                         (* R[i,j] says whether requester
        0..MaxRes-1] of boolean;                     i is requesting resource j *)
9   nrq: array [0..MaxReq-1] of                    (* number of resources
        0..MaxRes;                                   requested by a requester *)
10  S: array[0..MaxReq-1] of                       (* S[i] contains the granted
        -1..MaxRes;                                  request for requester i;
11                                                   if it contains -1, no request
                                                     was granted *)
12  procedure arbitrate;
13  begin
14      for req :=0 to MaxReq-1 do
15      begin
16          S[req] := -1;                          (* initialize schedule *)
17          nrq[req] := 0;
18          for res := 0 to MaxRes-1 do
19              if R[req,res] then                 (* calculate number of requests
                    nrq[req] :=                      for each requester *)
                    nrq[req]+1;
20      end;
21      for res := 0 to MaxRes-1 do                (* allocate resources one after
                                                     the other*)
22      begin
23          gnt :=-1;
24          if R[(I+res) mod MaxReq,               (* round-robin position wins *)
                (J+res) mod MaxRes] then
25              gnt :=(I+res) mod MaxReq
26          else                                   (* find requester with smallest
                                                     number of requests *)
27          begin
28              min := MaxRes+1;
29              for req := 0 to MaxReq-1 do
30              begin
31                  if (R[(req+|+res) mod MaxReq,(res+J) mod MaxRes]) and
                        (nrq[(req+|+res) mod MaxReq] <
                        min) then
32                  begin
33                      gnt := (req+|+res) mod MaxReq:
34                      min := nrq[(req+|+res) mod MaxReq]:
35                  end;
36              end;
37          end;
38          if gnt <> -1 then
39          begin
40              S[gnt] := (res+J) mod MaxRes;
41              for r := 0 to MaxRes-1 do R[gnt, r] := false;
42              nrq[gnt] := 0;
43              for req := 0 to MaxReq-1 do
44                  if R[req, (res+J) mod MaxRes] then nrq[req] := nrq[req]-1;
45          end;
```

APPENDIX A-continued

```
46      end;
47      I := (I+1) mod MaxReq;
48      if I = 0 then J := (J+1) mod MaxRes;
49  end;
```

APPENDIX B

```
1   var
2   I: 0..MaxReq-1;                                (* current round-robin requester
                                                     offset *)
3   J: 0..MaxRes-1;                                (* current round-robin resource
                                                     offset *)
4   req: 0..MaxReq-1;                              (* requester *)
5   res, r: 0..MaxRes-1;                           (* resource *)
6   gnt: -1..MaxReq-1                              (* granted request *)
7   min: 0..MaxRes+1;                              (* minimum number of
                                                     requests *)
8   R: array [0..MaxReq-1,                         (* R[i,j] says whether requester i
        0..MaxRes-1] of boolean;                     is requesting resource j *)
9   nrq: array [0..MaxReq-1]                       (* number of resources
        of 0..MaxRes;                                requested by a requester *)
10  S: array [0..MaxReq-1] of                      (* S[i] contains the granted
        -1..MaxRes;                                  request for requester i;
11                                                   if it contains -1, no
                                                     request was granted *)
12  procedure arbitrate;
13  begin
14      for req := 0 to MaxReq-1 do
15      begin
16          S[req] := -1,                          (* initialize schedule *)
17          nrq[req] := 0,
18          for res := 0 to                        (* calculate number of
                MaxRes-1 do                          requests for each requester*)
19              if R[req,res] then nrq[req] := nrq[req] +1;
20      end;
21      for res := 0 to MaxRes-1 do                (* check round-robin
                                                     positions first *)
22          If R[(I+res) mod MaxReq,(res+J) mod MaxRes] then
23          begin
24              gnt := (I+res) mod MaxReq;
25              S[gnt] := (res+J) mod MaxRes;
26              for r := 0 to MaxRes-1 do R[gnt, r] := false;
27              for req := 0 to MaxReq-1
                    do R[req, (res+J) mod MaxRes] := false;
28          end;
29      for res :=                                 (* allocate remaining resources
            0 to MaxRes-1 do                         'least choice first' *)
30      begin
31          gnt := -1;
32          min := MaxRes+1 ;
33          for req := 0 to                        (* find requester with smallest
                MaxReq-1 do                          number of requests *)
34          begin
35              if (R[(req+|+res) mod MaxReq,(res+J) mod
                    MaxRes]) and (nrq[(req+|+res)
                    mod MaxReq] < min) then
36              begin
37                  gnt := (req+|+res) mod MaxReq :
38                  min := nrq[(req+|+res) mod MaxReq];
39              end;
40          end;
41          if gnt <> -1 then
42          begin
43              S[gnt] := (res+J) mod MaxRes;
44              for r := 0 to MaxRes-1 do R[gnt,r] := false;
45              nrq[gnt] : = 0;
46              for req := 0 to MaxReq-1 do
47                  if R[req, (res+J) mod MaxRes] then nrq[req] :=
                        nrq[req]-1;
48          end;
49      end;
50      I := (I+1) mod MaxReq :
51      if I = 0 then J := (J+1) mod MaxRes;
52  end;
```

What is claimed is:

1. A method of sharing multiple resources among multiple requesters using an arbiter, comprising:

receiving requests for the multiple resources from the multiple requesters;

determining respective request priorities corresponding to respective requests for respective resources made by respective requesters, each request priority being determined according to at least a resource priority, resource priority being inversely related to a number of requests made for a particular resource; and allocating at least some of the resources according to request priorities.

2. The method as recited in claim 1, wherein at least one of the requesters is requesting multiple ones of the resources.

3. The method as recited in claim 1, wherein at least one resource is requested by multiple requesters.

4. The method as recited in claim 1 further comprising allocating at least one of the resources to one of the requesters according to a round robin scheme.

5. The method as recited in claim 4 wherein the round robin scheme considers multiple requests before allocating resources according to request priority.

6. The method as recited in claim 1 wherein the arbiter using the round robin scheme during an arbitration cycle in which all requests for all resources are considered, attempts to allocate at least one resource according to the round robin scheme prior to allocating resources according to request priority, thereby preventing starvation.

7. The method as recited in claim 1 wherein priority is assigned to at least each requested resource according to resource priority for each arbitration cycle.

8. The method as recited in claim 1 wherein assigning priorities further comprises:

combining resource priority and a requester priority to generate an assigned priority for each combined requester and resource priority.

9. The method as recited in claim 1 wherein the requesters are input ports of a network switch and the resources are output ports of the network switch, multiple ones of the output ports being accessible to more than one of the input ports.

10. The method as recited in claim 1 wherein the requesters are processors of a multi-processor system and the resources are memories coupled to the processors, each of the memories being accessible to more than one of the processors.

11. The method as recited in claim 1 further comprising recalculating priorities after each time a resource is allocated.

12. A method for allocating multiple resources to multiple requesters, comprising:

receiving requests for the multiple resources from the multiple requesters; and allocating respective resources to respective requesters according to respective priorities inversely related to a number of requests directed to respective ones of the resources.

13. The method as recited in claim 12 further comprising allocating the respective resources to the respective requesters according to a starvation avoidance mechanism.

14. The method as recited in claim 12, wherein the respective resource priorities are inversely related to the number of requests made for the respective resource.

15. An arbitration apparatus for arbitrating requests from a plurality of requesters for a plurality of resources, comprising:

means for receiving requests for resources from the requesters;

means for allocating requests according to at least resource priority; and means for determining resource priority according to a number of requests made for respective ones of the resources, respective resource priorities being inversely related to the number of requests made for the respective ones of the resources.

16. The arbitration apparatus as recited in claim 15 further comprising:

means for allocating requests according to requester priority; and means for determining requester priority for each respective requester according to a number of requests made by the respective requesters, the requester priority being inversely related to the number of requests.

17. The arbitration apparatus as recited in claim 15 further comprising means for preventing starvation for requests.

18. An apparatus comprising:

a transport mechanism attached to a plurality of resources and a plurality of requesters;

an arbiter coupled to receive a plurality of requests from the requesters, each of the requests requesting at least one of the resources, the arbiter allocating resources to requesters according to at least a resource priority, the resource priority being inversely related to a number of requests directed to respective resources.

19. The apparatus as recited in claim 18 wherein the arbiter further includes a round robin mechanism to allocate resources to requesters.

20. The apparatus as recited in claim 18 wherein the requesters are processors, the resources are memories, each of the memories being coupled to multiple ones of the processors and the transport mechanism is a plurality of buses coupling the processors to the memories.

21. The apparatus as recited in claim 18 wherein the requesters are input and output nodes of a network and the transport mechanism is a switch.

22. A method of sharing multiple resources among multiple requesters using an arbiter, comprising:

receiving requests for the multiple resources from the multiple requesters; and allocating resources among the requesters as a function of a number of requests made, wherein the function of the number of requests utilizes, at least in part, how many requests are made for each resource, and wherein resource allocation is inversely related to how many requests are made for each resource.

23. The method as recited in claim 22 wherein the function of the number of requests utilizes a combination of how many requests made for each resource and how many requests are made by each requester.

24. A computer program product encoded in at least one computer readable medium to implement an arbitration mechanism to allocate multiple resources among multiple requesters, the computer program product comprising:

code executable to receive requests for the multiple resources from the multiple requesters; and code executable to allocate respective resources to respective requesters according to respective priorities inversely related to a number of requests directed to respective ones of the resources.

25. The computer program product as recited in claim 24 wherein the computer program product further includes code to implement a starvation avoidance mechanism.

26. The computer program product as recited in claim 24, wherein the at least one computer readable medium is selected from the set of a disk, tape or other magnetic, optical, or electronic storage medium and a network, wireline, wireless or other communications medium.

* * * * *

UNITED STATES PATENT AND TRADEMARK OFFICE
CERTIFICATE OF CORRECTION

PATENT NO. : 6,882,649 B1
DATED : April 19, 2005
INVENTOR(S) : Nils Gura and Hans Eberle It is certified that error appears in the above-identified patent and that said Letters Patent is hereby corrected as shown below:

Column 1,
Line 5, "This copyright" should read -- The copyright --.

Column 5,
Line 33, "Schedule cycle 0: [1,0]," should read -- Schedule cycle 0: [0,0], --.
Line 34, "Schedule cycle 2: [1,0]," should read -- Schedule cycle 1: [1,0], --.

Column 8,
Line 16, "R[I+res, J+res]=I" should read -- R[I+res, J+res]=1 --.

Column 9,
Line 45, "input port and input port" should read -- input port 1 and input port --.

Column 10,
Line 8, "i(i=0 … n-1):" should read -- i(i=0...n-1): --.

Column 11,
Line 21, "J: 0..MaxReq-1;" should read -- J: 0..MaxRes-1; --.

Column 12,
Line 60, "mod MaxReq:" should read -- mod MaxReq; --.

Signed and Sealed this

Fifth Day of July, 2005

JON W. DUDAS
*Director of the United States Patent and Trademark Office*